US007181298B1

(12) United States Patent
Yoshio et al.

(10) Patent No.: US 7,181,298 B1
(45) Date of Patent: Feb. 20, 2007

(54) INFORMATION CONVERTING METHOD, INFORMATION CONVERTING APPARATUS AND INFORMATION REPRODUCING APPARATUS

(75) Inventors: Junichi Yoshio, Kawagoe (JP); Tetsuya Tenma, Tokorozawa (JP); Kyota Funamoto, Tokorozawa (JP); Yukiyoshi Haraguchi, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/550,078

(22) Filed: Apr. 14, 2000

(30) Foreign Application Priority Data

Apr. 16, 1999 (JP) ............................... 11-110132

(51) Int. Cl.
G06F 17/00 (2006.01)
H04N 9/00 (2006.01)
H04N 9/79 (2006.01)

(52) U.S. Cl. ........................... 700/94; 386/45; 386/39; 386/98

(58) Field of Classification Search ................ 386/39, 386/45, 98, 96, 95, 125, 126; 370/421, 464; 700/94
See application file for complete search history.

(56) References Cited

U.S. PATENT DOCUMENTS 5,802,017 A * 9/1998 Sato et al. ...................... 369/2
5,933,430 A * 8/1999 Osakabe et al. ............ 370/463
6,144,411 A * 11/2000 Kobayashi et al. ......... 348/441
6,370,322 B2 * 4/2002 Horiguchi et al. ............ 386/95
6,618,396 B1 * 9/2003 Kondo et al. ................ 370/474

OTHER PUBLICATIONS

"IEEE Standard for a High Performance Serial Bus", IEEE Std. 1394-1995, Aug. 30, 1996.*
"IEEE Standard for a High Performance Serial Bus", IEEE Std. 1394-1995, Aug. 30, 1996, (referenced at p. 2 of the specification).

* cited by examiner

Primary Examiner—Vivian Chin
Assistant Examiner—Devona E. Faulk
(74) Attorney, Agent, or Firm—Drinker, Biddle & Reath LLP

(57) ABSTRACT

An information converting method of converting audio information, which comprises a plurality of partial-audio information based on a predetermined record standard in each of which output control information to control a state of the audio information at a time of outputting the audio information to an external portion is included, into transmission information to be transmitted through a data bus based on a predetermined transmission standard, is provided with: an extracting process of extracting the output control information from each of the partial-audio information; a dividing process of dividing the audio information for each information amount, which is set in advance so as to transmit the transmission information through the data bus, to thereby generate divided-audio information; a generating process of adding the extracted output control information onto the generated divided-audio information to thereby generate an information unit for transmitting the audio information through the data bus; and an outputting process of generating the transmission information by using a plurality of the generated information units and outputting the generated transmission information onto the data bus.

21 Claims, 10 Drawing Sheets

INFORMATION CONVERTING METHOD, INFORMATION CONVERTING APPARATUS AND INFORMATION REPRODUCING APPARATUS

BACKGROUND OF THE INVENTION

1. Field of the Invention

The present invention relates to an information converting method, an information converting apparatus, and an information reproducing apparatus including such an information converting apparatus. More particularly, the present invention relates to an information converting method and an information converting apparatus, which can convert compressed audio information into transmission information that can be transmitted through a serial data bus, and an information reproducing apparatus including such an information converting apparatus.

2. Description of the Related Art

DVD has an improved record capacity equal to 7 times of that of a conventional CD (Compact Disc).

A so-called DVD video standard intended to mainly record dynamic picture information such as a movie and the like, and a so-called DVD audio standard intended to mainly record audio information with high sound quality are respectively established, as unified standards when the information is digitally recorded on the DVD. They are being distributed to a writer of the dynamic picture information, a writer of the audio information and the like, respectively.

Among them, according to the DVD audio standard, its large capacity enables, for example, control information for a so-called surround reproduction having realism and audio information of three or more channels to be reproduced at one time, which enables the surround reproduction to be enjoyed.

On the other hand, as a new standard intended to transmit information in a real time manner through a serial bus between a plurality of information processors (for example, between a personal computer and a digital vide camera or MD (Mini Disc) or the like), a so-called IEEE 1394 standard is published (a formal name of which is "IEEE Std. 1394-1995 IEEE Standard for a High Performance Serial Bus"). Then, a digital vide camera, a personal computer and the like having serial ports based on this standard are manufactured.

This IEEE 1394 standard is standardized such that a plurality of information processors (hereafter, which are merely referred to as "nodes") are connected through a serial bus to each other, and information transmissions corresponding to a plurality of channels can be executed in a time sharing manner between those respective nodes. The standard is also standardized such that the information transmissions can be done by using a maximum of 63 different channels within a system connected through one serial bus.

Here, the IEEE 1394 standard is standardized such that an initialization of a serial bus referred to as a so-called "bus reset" is executed when another node is newly connected to a group of nodes already connected through the serial bus to each other (namely, at a time of a bus connection) or when one node is disconnected from the group of nodes (namely, at a time of a bus disconnection). So, associated with the bus reset, the following processes are executed to thereby establish a connection manner of a new serial bus (hereafter, the connection manner is referred to as a "topology").

(1) In conjunction with the occurrence of the bus reset, a node that detects the occurrence of the bus reset (namely, a node to which another node is newly connected, or a node from which the a connection until that time is disconnected) sends out a bus reset signal indicative of the occurrence of the bus reset to all nodes connected to the serial bus.

(2) After the bus reset, a tree identification is carried out for connecting the respective nodes on a tree structure. Then, a node located at a vertex of the connected tree structure is recognized as a "route node".

(3) Next, the recognized route node makes each node recognize an identification number (ID number) peculiar to each node to identify each node within the tree structure.

(4) Next, communication states of all the nodes within the established tree structure (e.g., used channels and later-described transmission occupation time periods of the respective nodes) are managed. Then, an IRM (Isochronous Resource Manager) node is set which is a node for indicating a currently used channel and a transmission occupation time period currently occupied by each node in such a manner that those can be recognized by the other nodes.

(5) Finally, a "bus manager node" is set which is a node for managing the information transmission states of all the nodes.

A new topology after the bus reset is established through the above-mentioned processes at the five stages.

When the information is actually transmitted after the establishment of the topology, a "transmission node" implying a node which starts transmitting the information refers to a current communication state of another node with respect to the IRM node. If a channel and a transmission occupation time period desired to be used by the transmission node can be used, the transmission node obtains a right to transmit the information (actually, the transmission node reserves the channel to be used by the transmission node and the later-described transmission occupation time period) and starts transmitting the information. At this time, immediately before transmitting the information, the transmission node transmits to the IRM node the fact that the indication of the communication state in the IRM node is to be rewritten (namely, since the transmission node starts transmitting the information, the channel under the usage and the transmission occupation time period on the serial bus are changed. Thus, it is necessary to rewrite the content of the indication to a new communication state after this change). The IRM node receiving it executes a process for updating the content of the indication, respectively. After that, the content of the indication after the update can be referred to by the other nodes, respectively.

Next, the transmission occupation time period will be schematically described below.

In the IEEE 1394 standard, the information from the respective nodes is collectively transmitted for each unit referred to as an "isochronous cycle" (which implies one cycle generated by dividing the area on the serial bus in a time sharing manner). This isochronous cycle includes an isochronous transmission area, which includes the information transmitted synchronously with the information included in the other isochronous cycles (actually, video information, audio information or the like), and an asynchronous transmission area, which includes the information transmitted asynchronously with and independently of other information (actually, control information to control an output of the video information or the audio information, and the like). Then, the information within the isochronous transmission area is divided in a time sharing manner for each different channel. So, different information is transmitted for each channel.

At this time, it is standardized that a temporal length of the isochronous transmission area within one isochronous cycle is 100 μsec at the maximum, in the isochronous transmission area. Thus, it is necessary that a total of time periods occupied by the information assigned to each channel within one isochronous transmission area for its transmission is also equal to or less than 100 μsec. At this time, the transmission time period occupied by one channel within the isochronous cycle is the above-mentioned transmission occupation time period.

In addition, this transmission occupation time period may be referred to as a "utilization band of a serial bus", depending on a case, or may be referred to as a "utilization capacity of a serial bus". On the other hand, if the temporal length of the isochronous transmission area is less than 100 μsec (including a case of zero) within one isochronous cycle, a time period within the isochronous cycle other than the isochronous transmission area is used only as the synchronous transmission area.

According to the IEEE 1394 standard having the above-mentioned schematic configuration, a large capacity of information can be quickly transmitted irrespectively of an attribute of the video information, the audio information or the like in the transmission information to be transmitted, and for example, the copy control information and the like can be transmitted in addition to the transmission information. Thus, it is also possible to transmit the information while perfectly protecting a copyright with regard to the transmission information, for example.

However, the IEEE 1394 standard is not designed to quickly transmit the audio information recorded on an optical disc, such as DVD based on the above-mentioned DVD audio standard or the like, while protecting the copyright.

SUMMARY OF THE INVENTION

The present invention is proposed in view of the above mentioned problems. It is therefore an object of the present invention to provide an information converting method and an information converting apparatus, which can effectively convert audio information, which is sent in accordance with a certain standard such as the DVD audio standard and the like, into transmission information to be transmitted through a data bus such as a serial bus or the like in accordance with the IEEE 1394 standard, and an information reproducing apparatus having such an information converting apparatus.

The above object of the present invention can be achieved by an information converting method of converting audio information, which comprises a plurality of partial-audio information based on a predetermined record standard in each of which output control information to control a state of the audio information at a time of outputting the audio information to an external portion is included, into transmission information to be transmitted through a data bus based on a predetermined transmission standard. The information converting method is provided with: an extracting process of extracting the output control information from each of the partial-audio information; a dividing process of dividing the audio information for each information amount, which is set in advance so as to transmit the transmission information through the data bus, to thereby generate divided-audio information; a generating process of adding the extracted output control information onto the generated divided-audio information to thereby generate an information unit for transmitting the audio information through the data bus; and an outputting process of generating the transmission information by using a plurality of the generated information units and outputting the generated transmission information onto the data bus.

According to the information converting method of the present invention, since the information unit is generated by adding the output control information onto the divided-audio information, it is possible to efficiently convert the audio information in which the output control information is included into the transmission information, and it is also possible to control the output of the transmission information to the external after the transmission by using the output control information.

In one aspect of the information converting method of the present invention, the output control information comprises: first control information to be transmitted through the data bus, in response to the number of samplings preset in the audio information; and second control information to be transmitted through the data bus only if it is required, and if a transmission of the second control information is not required, the generating process generates the information unit comprising the divided-audio information, the first control information and predetermined other information in place of the second control information.

According to this aspect, it is possible to efficiently transmit the second control information as well as the predetermined other information.

In this aspect, the first control information may comprise mix control information to perform a channel mix process of the audio information at the time of outputting, and the second control information may comprise frequency identification information indicative of a sampling frequency of the audio information.

By constructing in this manner, at the time of outputting the audio information after the transmission, it is possible to surely perform the channel mix process and a process of identifying the sampling frequency.

Also, in this aspect, the generating process may add first identification information indicative of a content of the first control information at a position to be transmitted prior to the first control information within each of the information unit, and the generating process may add second identification information indicative of a content of the second control information at a position to be transmitted prior to the second control information within each of the information unit.

By constructing in this manner, since the first and second identification information are transmitted prior to the first and second control information respectively, it is possible for the transmission destination to surely identify the content of the first and second control information respectively.

In another aspect of the information converting method of the present invention, the predetermined transmission standard is an IEEE 1394 standard, the data bus comprises a serial data bus through which the transmission information is transmitted in accordance with the IEEE 1394 standard, and the information unit comprises one portion of an isochronous packet based on the IEEE 1394 standard.

According to this aspect, it is possible to speedily and efficiently transmit the transmission information in accordance with the IEEE 1394 standard after converting the audio information.

In another aspect of the information converting method of the present invention, the predetermined record standard is a DVD audio standard, the partial-audio information comprises an audio pack based on the DVD audio standard, and the output control information comprises information in a private header based on the DVD audio standard.

According to this aspect, it is possible to speedily and efficiently transmit the transmission information after converting the audio information based on the DVD audio standard.

The above object of the present invention can be also achieved by an information converting apparatus for converting audio information, which comprises a plurality of partial-audio information based on a predetermined record standard in each of which output control information to control a state of the audio information at a time of outputting the audio information to an external portion is included, into transmission information to be transmitted through a data bus based on a predetermined transmission standard. The information converting apparatus is provided with: an extracting device for extracting the output control information from each of the partial-audio information; a dividing device for dividing the audio information for each information amount, which is set in advance so as to transmit the transmission information through the data bus, to thereby generate divided-audio information; a generating device for adding the extracted output control information onto the generated divided-audio information to thereby generate an information unit for transmitting the audio information through the data bus; and an outputting device for generating the transmission information by using a plurality of the generated information units and outputting the generated transmission information onto the data bus.

According to the information converting apparatus of the present invention, since the information unit is generated by adding the output control information onto the divided-audio information, it is possible to efficiently convert the audio information in which the output control information is included into the transmission information, and it is also possible to control the output of the transmission information to the external after the transmission by using the output control information.

In one aspect of the information converting apparatus of the present invention, the output control information comprises: first control information to be transmitted through the data bus, in response to the number of samplings preset in the audio information; and second control information to be transmitted through the data bus only if it is required, and if a transmission of the second control information is not required, the generating device generates the information unit comprising the divided-audio information, the first control information and predetermined other information in place of the second control information.

According to this aspect, it is possible to efficiently transmit the second control information as well as the predetermined other information.

In this aspect, the first control information may comprise mix control information to perform a channel mix process of the audio information at the time of outputting, and the second control information may comprise frequency identification information indicative of a sampling frequency of the audio information.

By constructing in this manner, at the time of outputting the audio information after the transmission, it is possible to surely perform the channel mix process and a process of identifying the sampling frequency.

Also in this aspect, the generating device may add first identification information indicative of a content of the first control information at a position to be transmitted prior to the first control information within each of the information unit, and the generating device may add second identification information indicative of a content of the second control information at a position to be transmitted prior to the second control information within each of the information unit.

By constructing in this manner, since the first and second identification information are transmitted prior to the first and second control information respectively, it is possible for the transmission destination to surely identify the content of the first and second control information respectively.

In another aspect of the information converting apparatus of the present invention, the predetermined transmission standard is an IEEE 1394 standard, the data bus comprises a serial data bus through which the transmission information is transmitted in accordance with the IEEE 1394 standard, and the information unit comprises one portion of an isochronous packet based on the IEEE 1394 standard.

According to this aspect, it is possible to speedily and efficiently transmit the transmission information in accordance with the IEEE 1394 standard after converting the audio information.

In another aspect of the information converting apparatus of the present invention, the predetermined record standard is a DVD audio standard, the partial-audio information comprises an audio pack based on the DVD audio standard, and the output control information comprises information in a private header based on the DVD audio standard.

According to this aspect, it is possible to speedily and efficiently transmit the transmission information after converting the audio information based on the DVD audio standard.

The above object of the present invention can be also achieved by an information reproducing apparatus comprising (i) the above described information converting apparatus of the present invention, and (ii) a reproducing device for reproducing the audio information.

According to the information reproducing apparatus of the present invention, it is possible to efficiently transmit the inputted audio information together with the output control information through the data bus, and it is also possible to reproduce the audio information and directly output the reproduced audio information.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings.

(I) Explanation of Basic Items

At first, the DVD audio standard and the IEEE 1394 standard as the basic items used in the embodiments of the present invention are described prior to the actual explanation of the embodiments of the present invention.

(i) DVD Audio Standard

The DVD audio standard used in the embodiments is firstly described with reference to FIG. 1.

Figure 1:
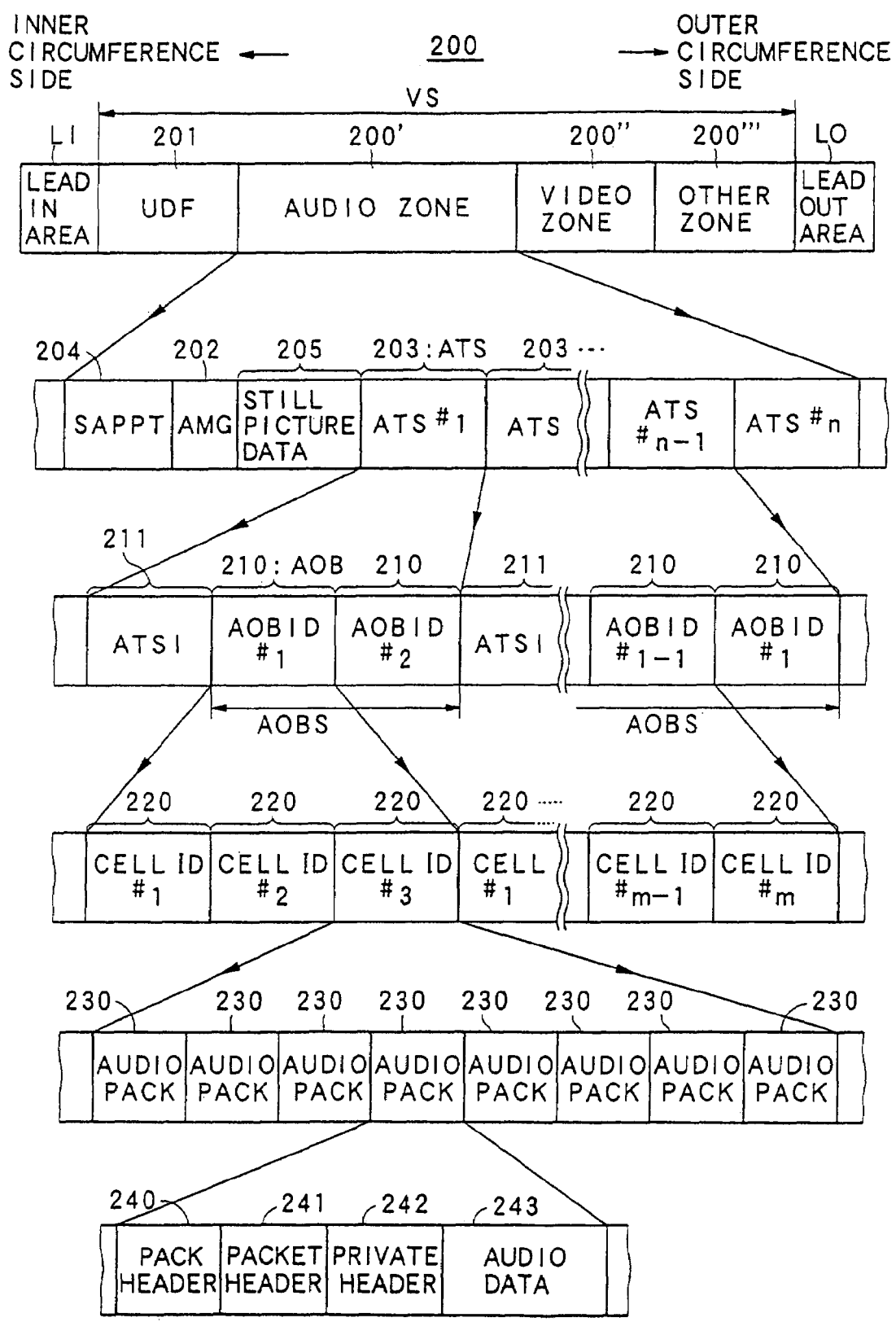
FIG. 1 is a diagram showing a record format of a DVD audio disc in an embodiment.

FIG. 1 is a diagram showing a record format when audio information is recorded on a later-described DVD audio disc in accordance with the DVD audio standard.

As shown in FIG. 1, a DVD audio disc 200 as an optical disc serving as an information record medium on which audio information is recorded in accordance with the DVD audio standard has a lead-in area LI at its innermost circumference and a lead-out area LO at its outermost circumference. One volume space VS is formed between them.

Within the volume space VS, there are formed, from the side of the lead-in area LI, a UDF (Universal Disc Format) 201 including information to manage a file structure of the audio information recorded on the DVD audio disc 200, at least one audio zone 200' actually including the audio information and still picture information in relation to the audio information, at least one video zone 200" actually including dynamic picture information or sub picture information (for example, a character information, such as a caption indicated in the dynamic picture and the like), and an other zone 200''' including information other than the picture information or the audio information (for example, mere character information and the like).

The audio information included in the audio zone 200' is divided into a plurality of ATSs (Audio Title Sets) 203 (ATS #1 to ATS #n), each having an ID (Identification) number. Moreover, a SAPPT (Simple Audio Play Pointer Table) 204 which is information needed to reproduce the audio information through a plurality of channels (this SAPPT 204 is always recorded in all the DVD audio discs 200 having the audio zones 200'), an AMG (Audio Manager) 202 which is information needed to reproduce a later-described title group recorded within the audio zone 200', and still picture data 205 which is data of a still picture corresponding to the audio information included within the audio zone 200' are recorded, from a lead of the audio zone 200', in portions other than the ATSs 203 within the audio zone 200'.

Start addresses and end addresses indicative of record positions on the DVD audio disc 200 in all tracks (e.g., musical compositions) which can be reproduced through the plurality of channels, a lead PTS (Presentation Time Stamp) of each track, a track reproduction time and the like are recorded in the SAPPT 204.

Information with regard to the entire audio information recorded on the DVD audio disc 200, such as a menu to prompt a viewer to select an item, information to protect an illegal copy, an access table to reproduce each title and the like are recorded in the AMG 202.

Next, one ATS 203 is provided with a plurality of AOBs (Audio Objects) 210, each having an ID number, with an ATSI (Audio Title Set Information) 211 as a lead.

Here, a portion constituted by the plurality of AOBs 210 is typically referred to as an AOB set (AOBS). This AOB set is intended to discriminate an actual portion of the audio information from other control information and the like.

Information, such as ATSPGCI (Audio Title Set Program Chain Information) implying various information with regard to a program chain which is a logical block combined by a plurality of cells (the cell will be described later) and the like, is recorded at a lead of the ATS 203.

The actual portion of the audio information is included in each AOB 210. One AOB 210 is composed of a plurality of cells 220 each having an ID number.

One cell 220 is composed of a plurality of audio packs 230, each of which is packed and a bottom layer of a hierarchical structure. Here, the audio pack 230 is an element in which the audio information to be recorded on the DVD audio disc 200 is packed for each predetermined size.

The one cell 220 may include therein a real time information pack including: information with regard to a composer and a copyright; text information such as a name of a song, words of a song and the like; access information to access a home page of Internet; BPM (Beat Per Minutes); rhythm information and so on, instead of one or more audio packs 230, other than the above-mentioned audio packs 230.

One audio pack 230 includes, from a lead thereof, a pack header 240, a packet header 241, a private header 242 and audio data 243. The packet header 241 includes an identification number to identify a packet based on a form referred to as a private stream 1 in accordance with the DVD audio standard, including the audio information within the audio pack 230 and the like. The private header 242 includes output control information to control the reproduction manner (actually, the number of channels at a time of a reproduction, a condition as to whether or not a reproduction is done after an application of an emphasis process, a condition as to whether or not a reproduction is done after a control of a dynamic range and the like), for example, when a transmitted digital signal is converted and amplified by an amplifier corresponding to the DVD audio standard and is then reproduced as sound information by a speaker, after the audio information reproduced from the DVD audio disc 200 by a later-described information reproducing device 100 and an identification number to identify that the audio information is actually included are transmitted in accordance with the IEEE 1394 standard. The audio data 243 is the actual portion of the audio information.

The later-described embodiment is designed so as to transmit the output control data included in the private header 242 together with the reproduced audio information and then output it as sound information after the amplifier, which is a transmission destination, performs various processes on the audio information in accordance with the output control data.

(ii) IEEE 1394 Standard

The information transmission through the serial bus in accordance with the IEEE 1394 standard (hereafter, merely referred to as a serial bus standard) according to the embodiment will be described below FIGS. 2A to 4.

Figure 2A:
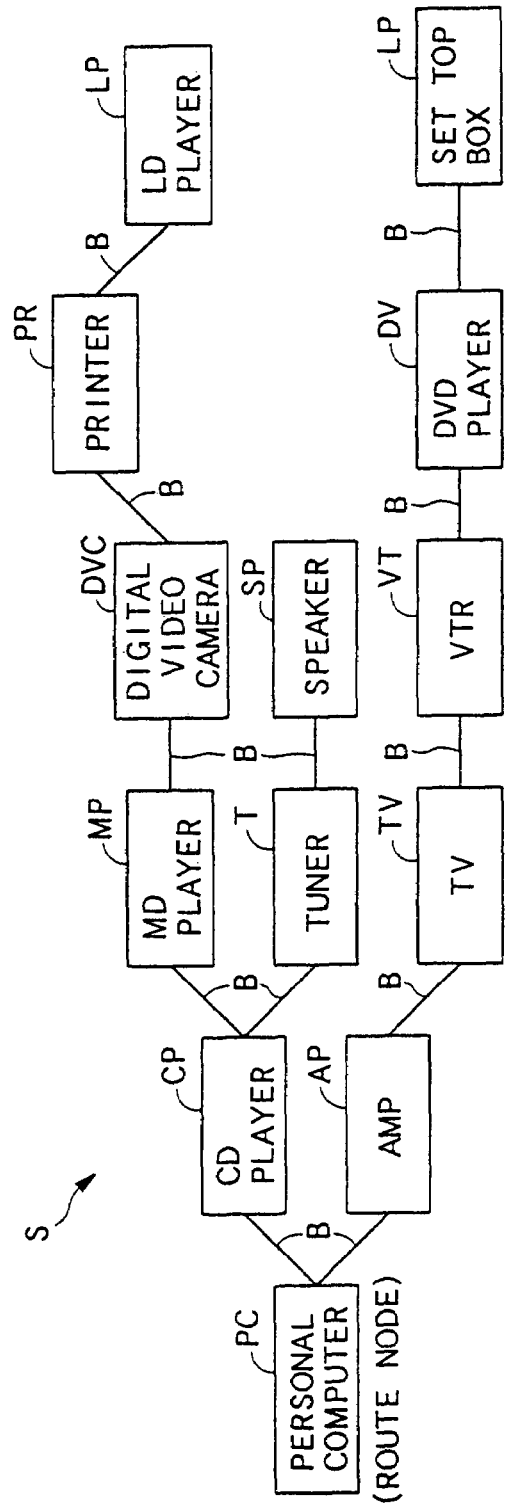
FIG. 2A is a diagram showing an example of serially-connected electrical apparatuses, in electrical products (nodes) connected in accordance with the IEEE 1394 standard.
Figure 2B:
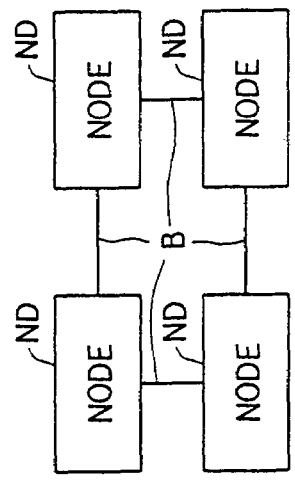
FIG. 2B is a diagram showing a loop connection in the electrical products (nodes) in accordance with the IEEE 1394 standard.
Figure 3A:
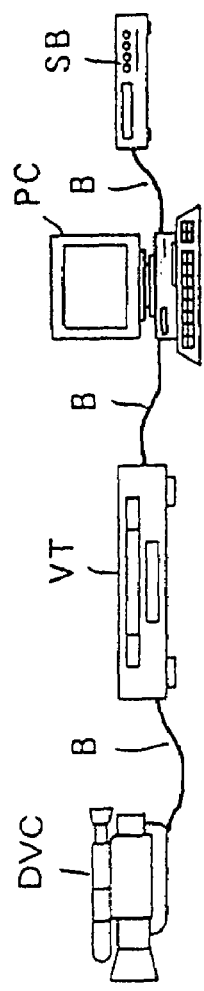
FIG. 3A is a diagram exemplifying a transmission manner on a serial bus.
Figure 3B:
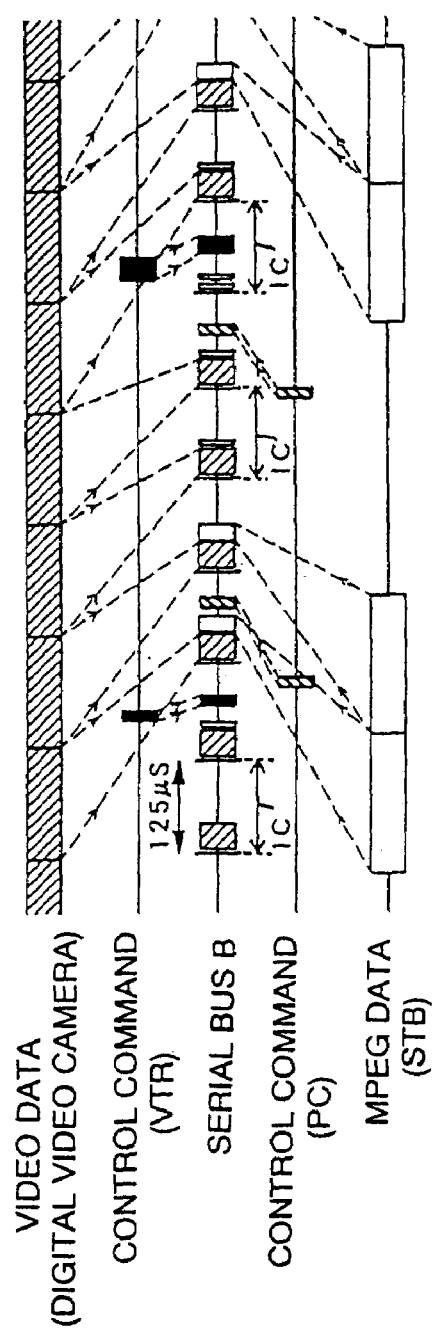
FIG. 3B is a time chart indicating various data and command in the transmission manner on the serial bus.
Figure 4:
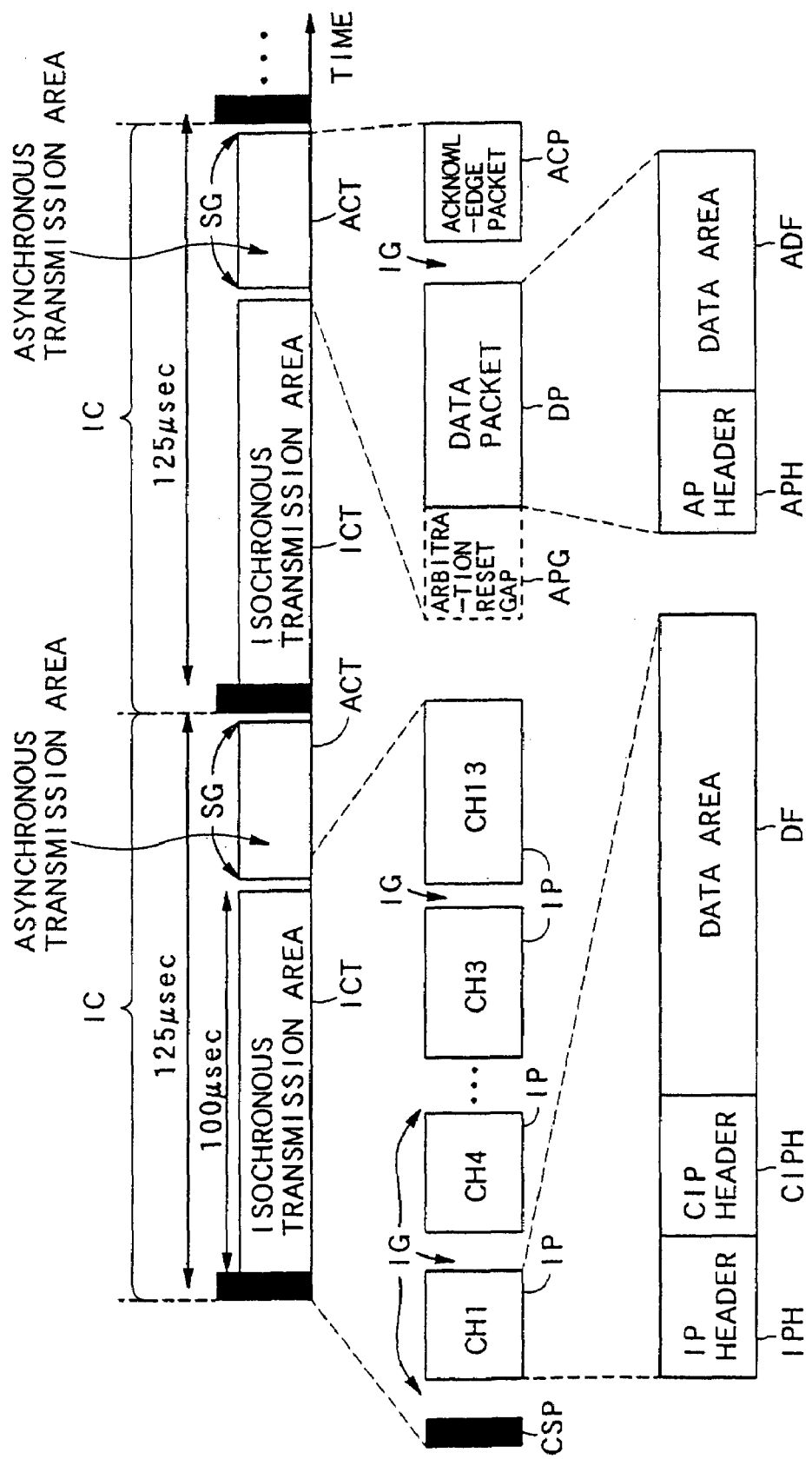
FIG. 4 is a diagram showing a configuration of an isochronous cycle.

FIGS. 2A and 2B are diagrams showing an example of a topology in the serial bus standard. FIGS. 3A and 3B diagrams exemplifying the transmission manner on the serial bus. FIG. 4 is a diagram showing the configuration of an isochronous cycle.

The serial bus standard is the standard of the serial bus intended to serially connect all information processors including various electrical products, which are currently used or may be considered in future, and then send and receive information between them.

Actually, settings when the respective nodes are connected are all automatically done. Moreover, a new node can be connected without turning off a power source.

On the other hand, as for the manner of the information transmission, a fast transmission is possible in a range between 100 Mbps (Mega bit per second) and 3.2 Gbps (Giga bit per second). Moreover, various information can be transmitted through a real time transmission, a two-way transmission and a multiple-channel transmission.

Also, as for the connection manner between the respective nodes, as in an information transmitting system S shown in FIG. 2A, for example, with a personal computer PC as a route node (as mentioned above, the node at the vertex in the topology in the tree structure), various electrical products, such as a CD (Compact Disc) player CP, an MD (Mini Disc) player MP, a digital video camera DVC, a printer PR, an LD (LASER Disc) player LP, a tuner T, a speaker SP, an amplifier AP, a television TV, a digital video tape recorder VT, a DVD player DV, a broadcast wave reception set top box SB and so on are connected to each other through a serial bus B serving as a data bus. So, they can be controlled by the management of the personal computer PC.

Here, in the serial bus standard, the number of information processors (corresponding to the nodes) that can be included in one system (i.e., a system connected in the tree structure through the serial bus B) is 63 at the maximum. Moreover, the one system can has 16 connections at the maximum between two nodes. In addition, it is inhibited on the standard to connect a plurality of nodes ND within the one system, in a form of loop as shown in FIG. 2B.

The actual transmission manner will be actually exemplified below.

At first, as shown in FIG. 3A, it is assumed that the digital video camera DVC, the digital video tape recorder VT, the personal computer PC and the set top box SB respectively serving as the nodes are connected through the serial bus B to each other, and that the information transmissions are done. Actually, it is assumed that video data is sent out by the digital video camera DVC onto the serial bus B, a predetermined control command is sent out by the digital video tape recorder VT onto the serial bus B, a control command to similarly control another device is sent out by the personal computer PC onto the serial bus B, and that the video data included in a received broadcast wave (for example, MPEG data compressed on the basis of an MPEG (Moving Picture Expert Group) standard) is sent out by the set top box SB onto the serial bus B, respectively.

In this case, as the transmission manner of the respective information sent out onto the serial bus B, the information from the respective nodes are transmitted while they respectively occupy the serial bus B in a time sharing manner, as shown in FIG. 3B. Then, each information is inserted into the isochronous cycle IC implying a synchronous unit on the serial bus B having a length of 125 μsec, and is transmitted.

The data structure within the isochronous cycle IC will be described below with reference to FIG. 4.

As shown in FIG. 4, the isochronous cycle IC is provided with an isochronous transmission area ICT and an asynchronous transmission area ACT. The isochronous transmission area ICT is provided with: a cycle start packet CSP which is always inserted into a lead of the isochronous cycle IC in order to match the standard times of all the nodes; and isochronous packets IP corresponding to a plurality of channels. The isochronous transmission area ICT is also provided with the isochronous packets IP respectively including the information temporally synchronous with each other. The asynchronous transmission area ACT includes the asynchronous information (for example, various control information, response information corresponding to the respective control information and the like).

Also, a sub action gap SG that is a temporal gap indicative of an end of one isochronous transmission area ICT or an end of one asynchronous transmission area ACT is inserted into a final tail of each isochronous transmission area ICT and a final tail of each asynchronous transmission area ACT. Moreover, an isochronous gap IG that is a temporal gap indicative of an end of each packet is inserted between the respective isochronous packets IP and between the cycle start packet CSP and the lead of the isochronous packet IP. At this time, a length of the sub action gap SG is set to be longer than that of the isochronous gap IG.

One isochronous packet IP is composed of: an IP (Isochronous Packet) header IPH including information indicative of a data amount within each isochronous packet IP, information indicative of a channel through which the information within each isochronous packet IP is transmitted, and the like; a later-described CIP header CIPH; and a data area DF including the actual video information or audio information.

On the other hand, the asynchronous transmission area ACT is composed of: an arbitration reset gap APG that is a temporal gap for each node to indicate that each node sends or receives the information; a data packet DP including data such as control information to be asynchronously transmitted and the like; and an acknowledgement packet ACP including data used for a reply from a node of the transmission destination. Here, an asynchronous gap AG that is a temporal gap indicative of an end of one data packet DP is inserted between the data packet DP and the acknowledgement packet ACP.

One data packet DP is composed of: an AP (Asynchronous Packet) header APH including information indicative of a destination of each data packet DP; and a data area ADF including information indicative of a transmission occupation time period of the data packet DP occupying the asynchronous transmission area ACT and information indicative of an occupation channel or actual control information and the like.

According to the above-mentioned serial bus standard, the control information is quickly transmitted from the information processor, such as the personal computer or the like, to thereby enable the unified control of the domestic electrical products or the audio visual apparatuses, such as the DVD player and the like, and also enable the video information, the audio information or the like to be mutually transmitted between the respective nodes quickly and accurately.

(II) Embodiment of Information Reproducing Apparatus

The embodiments of the information reproducing apparatus according to the present invention and considering the above-mentioned basic items will be described below with reference to FIGS. 5 to 10.

The following embodiment is the embodiment in which the present invention is applied to an information reproducing apparatus serving as one node, which reproduces the audio information and the video information from an optical disc, on which the audio information and the video information are recorded in accordance with the above-mentioned DVD audio standard, and then outputs them to the external portion, and also transmits the reproduced audio information and the like in accordance with the serial bus standard.

Figure 5:
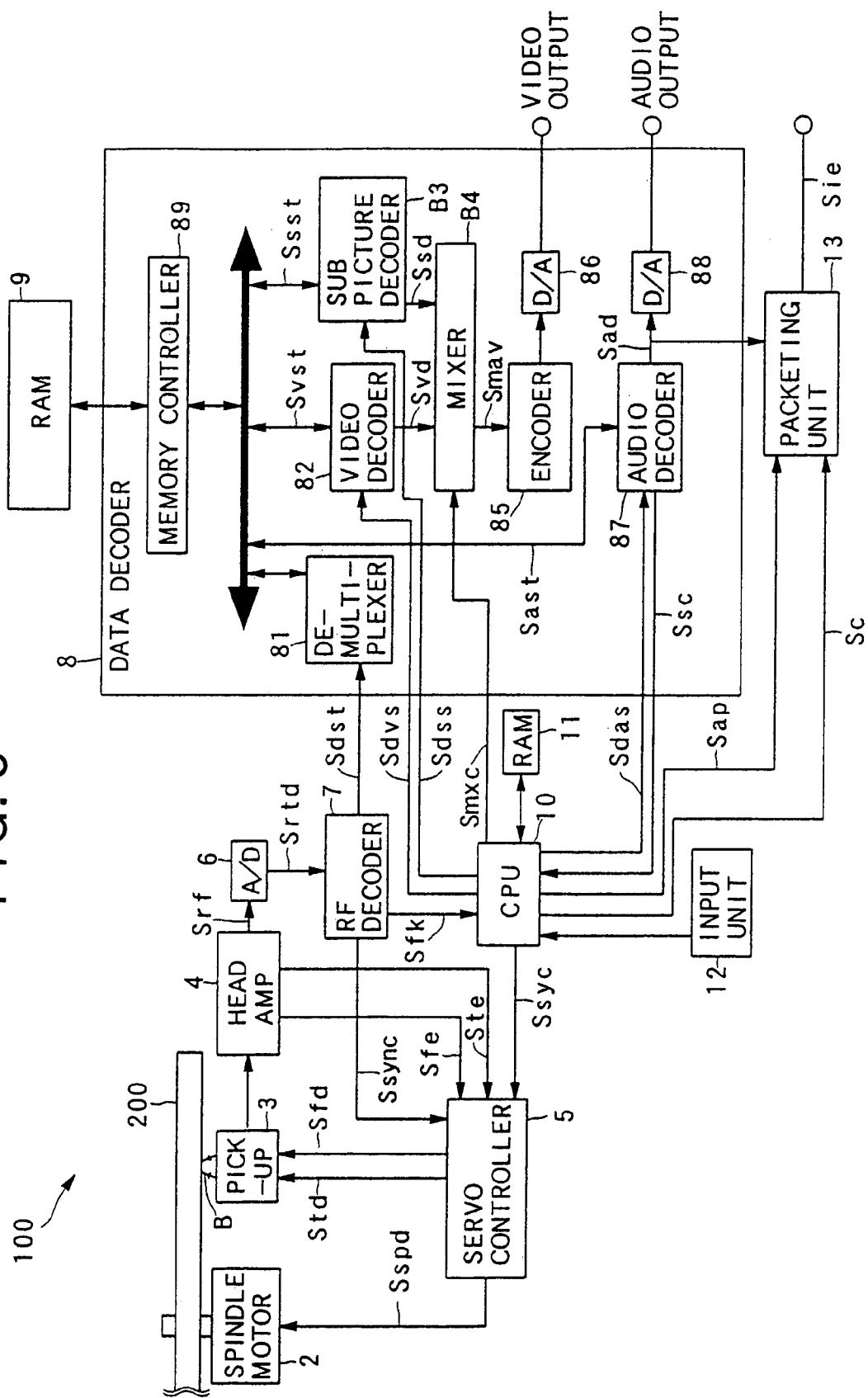
FIG. 5 is a block diagram showing a schematic configuration of an information reproducing apparatus in the embodiment.
Figure 6:
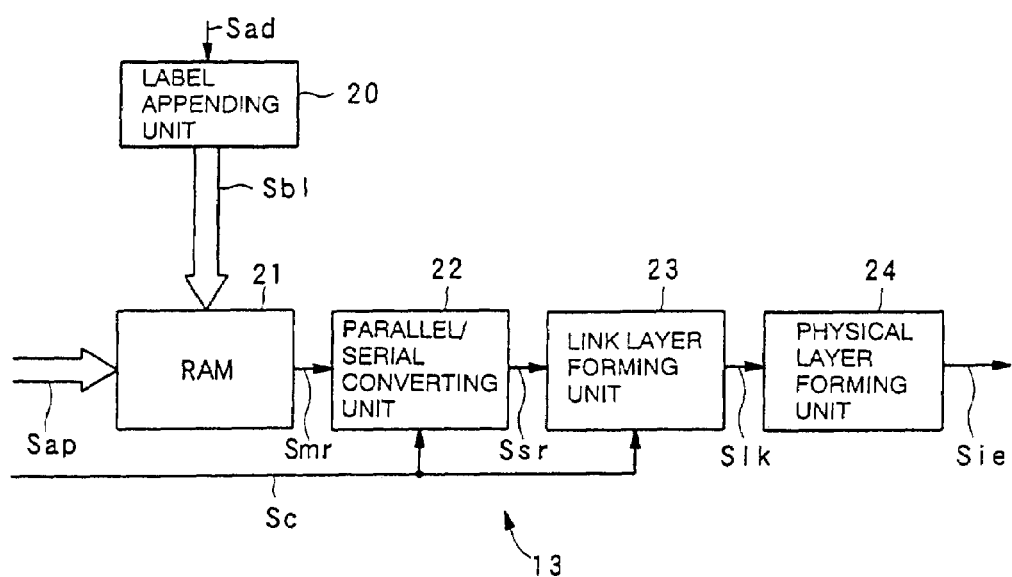
FIG. 6 is a block diagram showing a schematic configuration of a packeting unit in the information reproducing apparatus in the embodiment.
Figure 7:
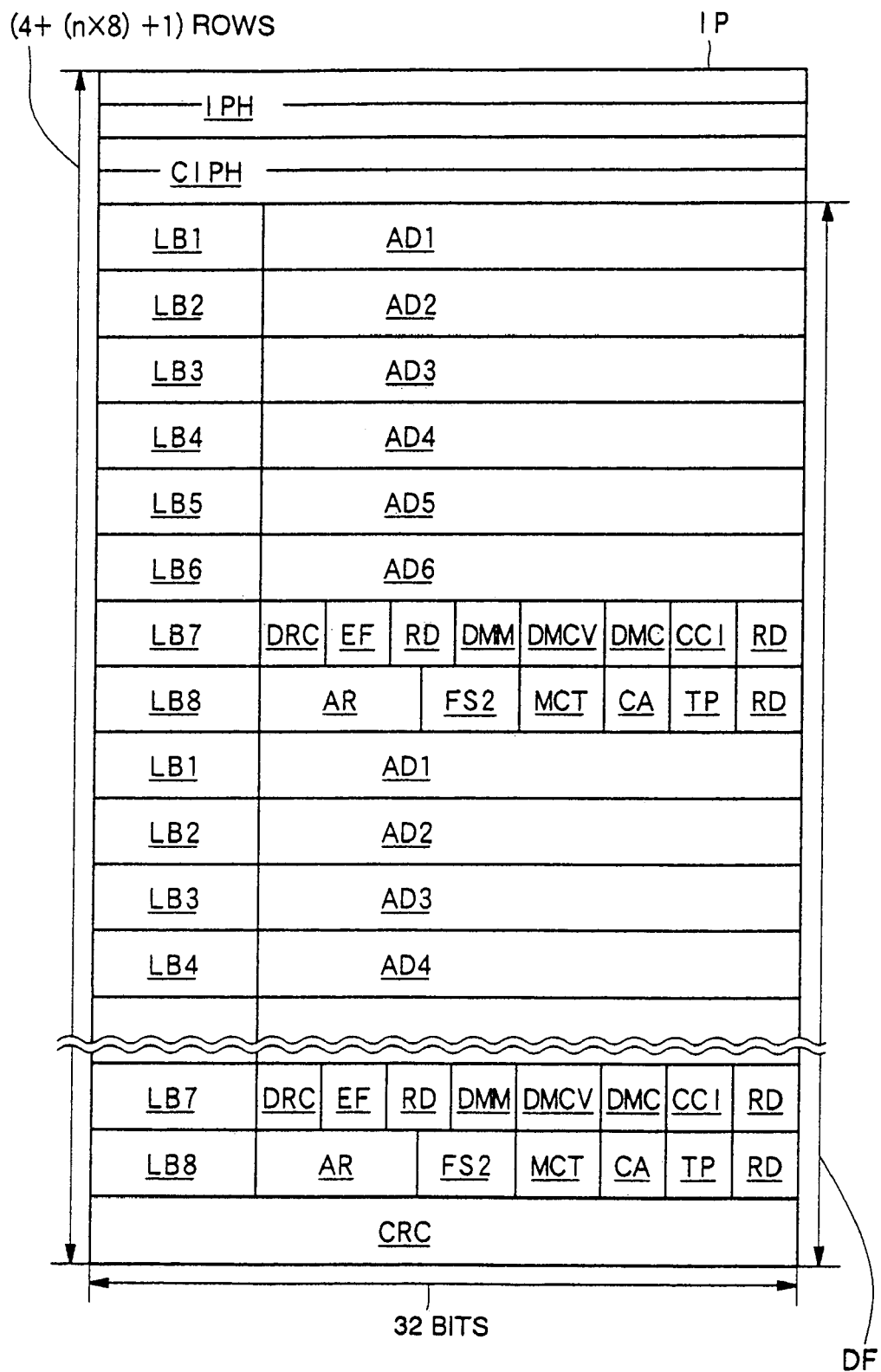
FIG. 7 is a diagram (I) exemplifying a configuration of an isochronous packet according to the embodiment.
Figure 8:
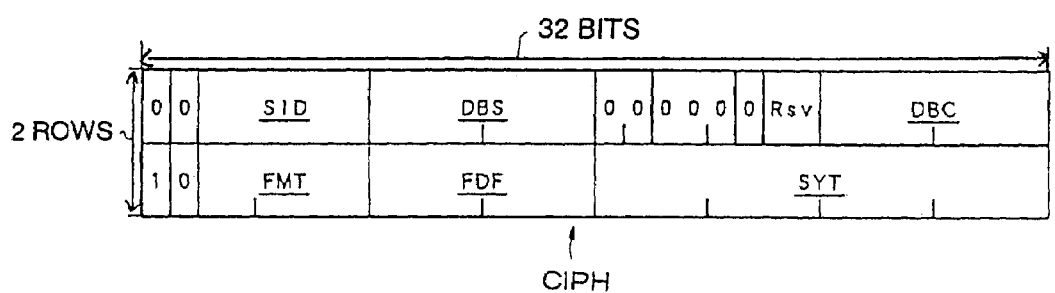
FIG. 8 is a diagram exemplifying a configuration of a CIP header according to the embodiment.
Figure 9:
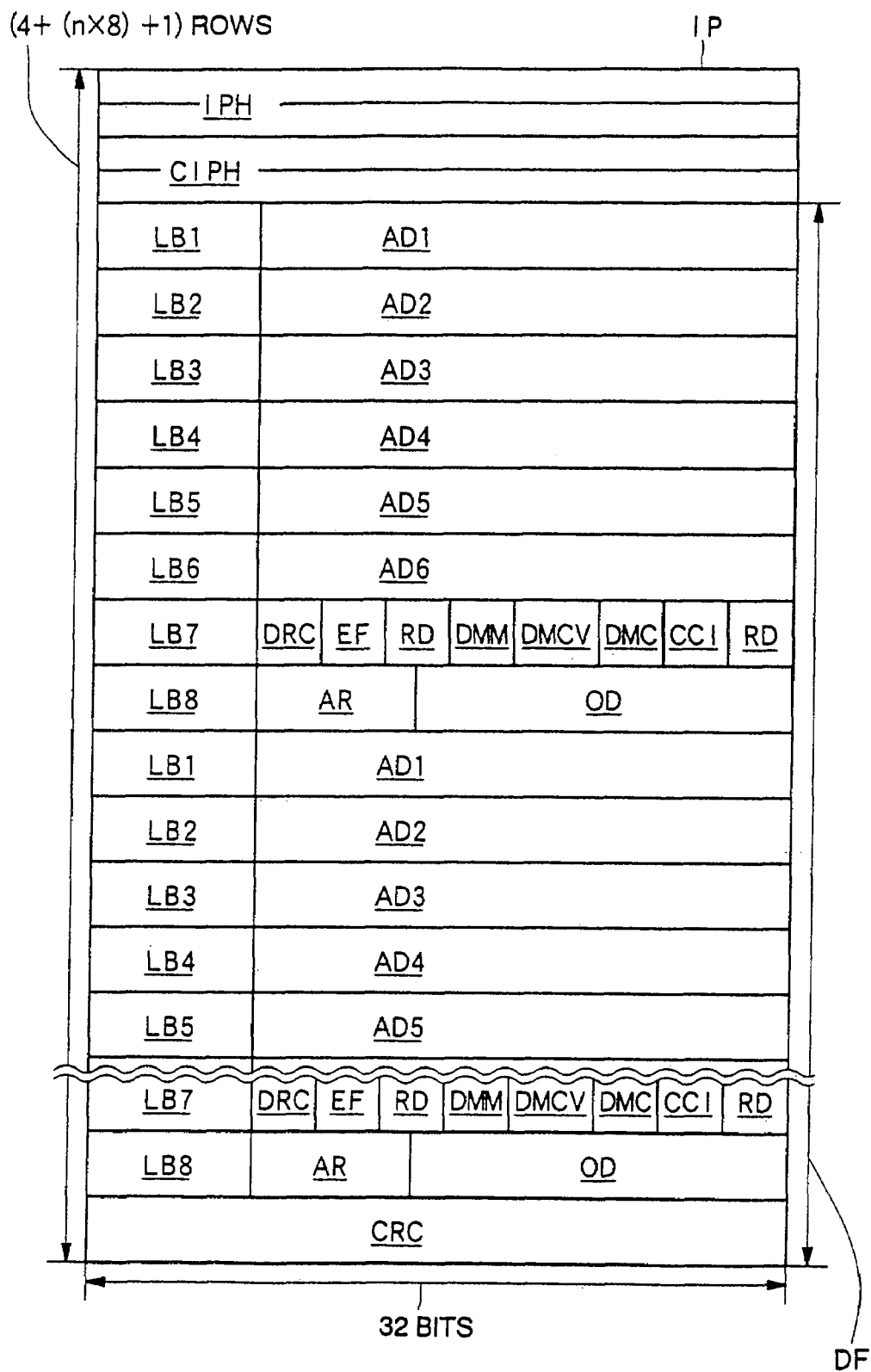
FIG. 9 is a diagram (II) exemplifying a configuration of an isochronous packet according to the embodiment.
Figure 10:
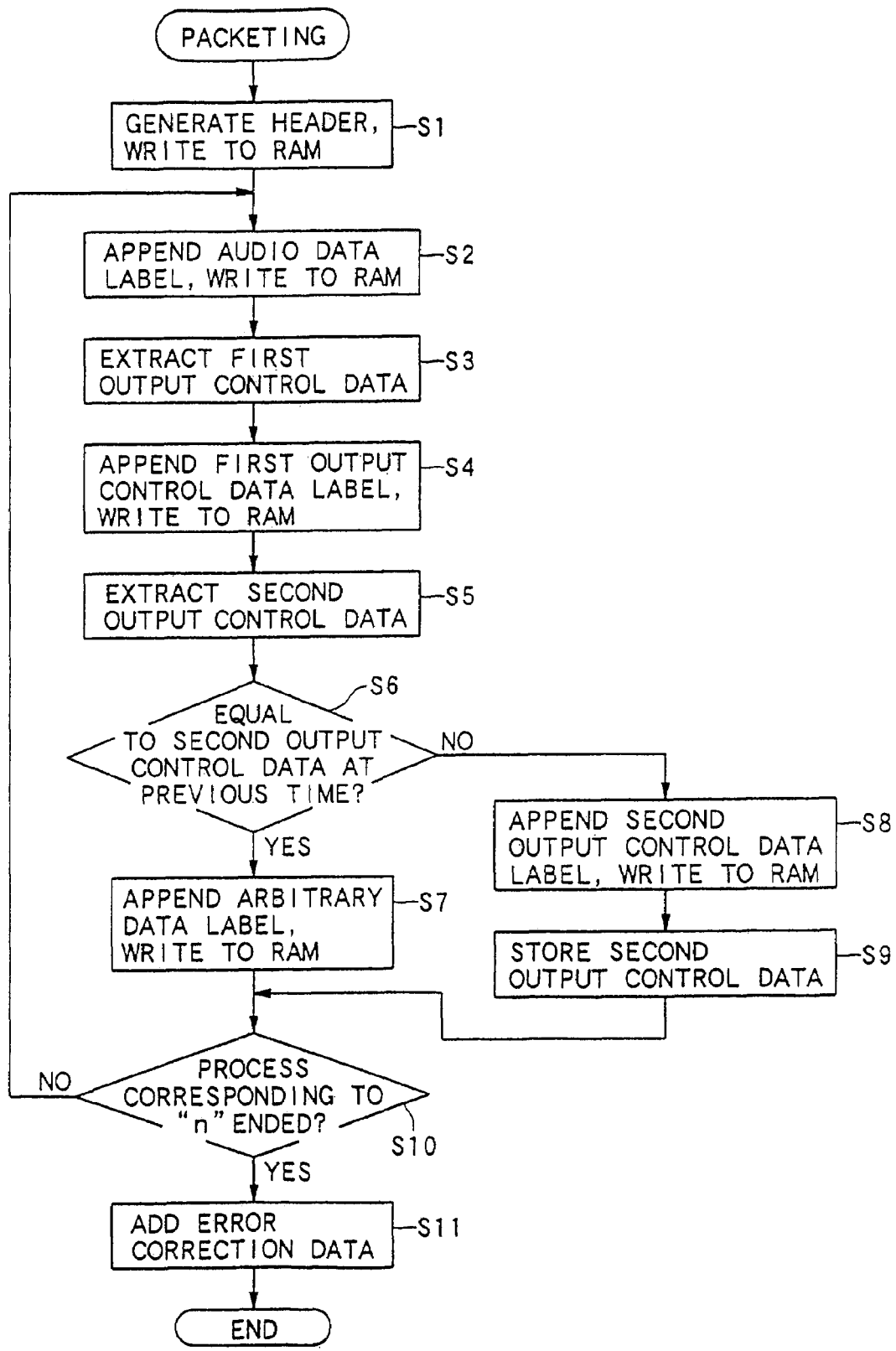
FIG. 10 is a flowchart showing a process for generating the isochronous packet in the embodiment.

FIGS. 5 and 6 are block diagrams respectively showing the schematic configuration of the information reproducing apparatus. FIGS. 7 and 8 are diagrams showing the actual configuration of the isochronous packet IP according to the embodiment. FIG. 9 is a diagram showing another example of the configuration of the isochronous packet IP. FIG. 10 is a flowchart showing the process for generating the isochronous packet IP.

At first, the schematic configuration of the information reproducing apparatus according to the embodiment is described with reference to FIG. 5.

As shown in FIG. 5, an information reproducing apparatus 100 according to the embodiment is provided with a spindle motor 2, an optical pickup 3, a head amplifier 4, a servo controller 5, an A/D (Analog to Digital) converter 6, an RF (Radio Frequency) decoder 7 serving as one example of an extracting device, a data decoder 8, RAMs (Random Access Memories) 9 and 11, a CPU 10, an input unit 12, and a packeting unit 13 serving as one example of a dividing device, a generating device and an outputting device.

The data decoder 8 is provided with a de-multiplexer 81, a video decoder 82, a sub picture decoder 83, a mixer 84, an encoder 85, D/A (Digital to Analog) converters 86 and 88, an audio decoder 87 serving as one example of a reproducing device, and a memory controller 89.

As shown in FIG. 6, the packeting unit 13 is composed of a label appending unit 20, a RAM 21, a parallel/serial converting unit 22, a link layer forming unit 23 and a physical layer forming unit 24.

Next, the schematic operation will be described below.

The spindle motor 2 rotates a DVD audio disc 200 placed on a turn table (not shown) at a predetermined linear velocity, in accordance with a spindle control signal Sspd outputted by the servo controller 5 as described later.

At this time, the optical pickup 3 emits a light beam B, such as a laser light or the like for the information reproduction, onto the DVD audio disc 200. The optical pickup 3 also receives a reflection light from an information record surface of the DVD audio disc 200 of the light beam B, and outputs a detection signal, which corresponds to a light amount of the received reflection light, to the head amplifier 4.

Accordingly, the head amplifier 4 performs a predetermined amplification process and the like on the detection signal outputted by the optical pickup 3, and generates a focus error signal Sfe indicative of a deviation of a position in a direction vertical to the information record surface of a focal point of the light beam B and a tracking error signal Ste indicative of a deviation of a position in a direction parallel to the information record surface of the focal point, and then outputs them to the servo controller 5. The head amplifier 4 also generates an RF signal Srf including a diffraction light component of the light beam B obtained by the diffraction of the light beam B through a pit row formed on the DVD audio disc 200 corresponding to the recorded record information, and further outputs it to the A/D (Analog/Digital) converter 6.

Then, the servo controller 5 constitutes a servo loops for the focus servo control and the tracking servo control in response to a servo control signal Ssvc from the CPU 10. The servo controller 5 generates a focus actuator drive signal Sfd in accordance with the focus error signal Sfe outputted by the head amplifier 4, and then outputs it to a focus actuator (not shown) of the optical pickup 3. The servo controller 5 also generates a tracking actuator drive signal Std in accordance with the tracking error signal Ste, and further outputs it to a tracking actuator (not shown) of the optical pickup 3.

In addition to them, the servo controller 5 detects a frequency difference and a phase difference between a standard signal (not shown) and a synchronous signal Ssync having a cycle synchronous with a rotation cycle of the DVD audio disc 200 outputted by the RF decoder 7, and then generates the spindle control signal Sspd in accordance with the frequency difference and the phase difference, and further outputs it to the spindle motor 2.

Due to those actions of the servo controller 5, the light beam B is controlled so as to be accurately moved on the pit row while it is focalized on the information record surface of the DVD audio disc 200 which is driven to be rotated at the predetermined linear velocity corresponding to the standard signal.

On the other hand, the RF signal Srf outputted from the head amplifier 4 to the A/D converter 6 is digitized by the A/D converter 6, is converted into a digital RF signal Srfd, and is outputted to the RF decoder 7.

The RF decoder 7 extracts the synchronous signal Ssync from the outputted digital RF signal Srfd, and outputs it to the servo controller 5. The RF decoder 7 also caries out a demodulation process and an error correction process in accordance with a record modulation method, such as an 8/16 modulation and the like, in the record information recorded on the DVD audio disc 200, to thereby decode the digital RF signal Srfd into a record information data stream Sdst, which has the data structure shown in FIG. 1 and includes a video stream, an audio stream and a sub picture stream. Then, the RF decoder 7 outputs the record information data steam Sdst to the data decoder 8.

In addition to them, the RF decoder 7 extracts the output control data included in the private header 242 from the decoded record information data stream Sdst, and then outputs it as an output control signal Sfk to the CPU 10.

Next, the data decoder 8 extracts a video stream (mainly, a video stream detected from the video zone 200" shown in FIG. 1), an audio stream (mainly, an audio stream detected from the audio zone 200' shown in FIG. 1) and a sub picture stream, respectively, from the record information data stream Sdst outputted from the RF decoder 7 under the control of the CPU 10, and respectively decodes them in accordance with a predetermined encoding method defined for each stream, to thereby generate the video data, the audio data Sad and the sub picture data, respectively.

The packeting unit 13 packets the audio data Sad and addition data Sap, which is outputted from the CPU 10 and includes addition information required to generate the isochronous packet IP to be included in a later-described transmission signal Sie and the output control signal Sfk, in order to comply the audio data Sad and addition data Sap with the serial bus standard, in accordance with a control signal Sc from the CPU 10, to thereby generate the isochronous packet IP. The packeting unit 15 outputs it as the transmission signal Sie through the IEEE 1394 interface (not shown) onto the serial bus.

Next, the detailed operation of the data decoder 8 will be described below with reference to FIG. 5.

At first, the de-multiplexer 81 extracts a video stream Svst, an audio stream Sast and a sub picture stream Ssst, respectively, from the record information data stream Sdst outputted by the RF decoder 7, and then distributes the video stream Svst to the video decoder 82, the audio stream Sast to the audio decoder 87, and the sub picture stream Ssst to the sub picture decoder 83, respectively, through a data bus 80, the memory controller 89 and the RAM 9.

The audio decoder 87 decodes one audio stream Sast among a maximum of 8 audio streams Sast outputted by the de-multiplexer 81, on the basis of a decode control signal Sdas (actually including a stream number, an encoding method code and the like) with regard to the audio stream outputted from the CPU 10 and generates the audio data Sad. Then, the audio decoder 87 outputs the audio data Sad to the D/A converter 88 and the packeting unit 13.

Here, in this embodiment, the following explanation is done under the assumption that audio data of 6 channels for the surround reproduction is included in the audio stream Sast to be reproduced while the audio data is switched for each sampling clock of a constant cycle. At this time, the audio decoder 87 generates a clock signal Ssc synchronous with the sampling clock, and then outputs it to the CPU 10.

On the other hand, in accordance with a decode control signal Sdvs (actually, including the encoding method code and the like) with regard to the video streams Svst outputted from the CPU 10, the video decoder 82 decodes the video stream Svst outputted by the de-multiplexer 81, and then generates the video data Svd, and further outputs it to the mixer 84.

Moreover, in accordance with a decode control signal Sdss (actually, including the stream number, the encoding method code and the like) with regard to the sub picture stream Ssst outputted from the CPU 10, the sub picture decoder 83 decodes the sub picture stream Ssst outputted by the de-multiplexer 81, and then generates a sub picture data Ssd, and further outputs it to the mixer 84.

Accordingly, the mixer 84 synthesizes the video data Svd and the sub picture data Ssd in accordance with a superimposition control signal Smxc outputted from the CPU 10. At this time, if the superimposition control signal Smxc at an H (High) level is outputted from the CPU 10, the mixer 84 outputs data in which the sub picture data Ssd is superimposed on the video data svd, as a superimposition video data Smxv, to the encoder 85. If the superimposition control signal Smxc at an L (Low) level is outputted from the CPU 10, the encoder 84 outputs the video data Svd as the superimposition video data Smxv to the encoder 85 without superimposing the sub picture data Ssd on the video data Svd.

Then, the encoder 85 encodes the outputted superimposition video data Smxv to the video format data based on a predetermined television method, and then outputs it to the D/A converter 86.

Accordingly, the D/A converter 86 converts the outputted video format data into an analog signal, and then outputs it to an outer monitor (not shown) and the like.

In response to the above-mentioned operations, in accordance with an operational command outputted by the input unit 12 operated by a user, the CPU 10 outputs the servo control signal Ssvc to the servo controller 5. In order to control the decoding processes at the respective decoders in the data decoder 8, the CPU 10 also generates the respective decode control signals Sdas, Sdvs and Sdss, and the superimposition control signal Smxc, and then outputs them to the data decoder 8, and also carries out the operation control mainly in relation to the whole information reproducing operation of the information reproducing apparatus 100. The processes of the CPU 10 are executed while the data is sent and received between the RAM 11.

The detailed operation of the packeting unit 13 and the operation of the CPU 10 in relation to this detailed operation will be described below.

As mentioned above, the packeting unit 13 uses the information included in the addition data Sap and the audio data Sad to then generate the isochronous packet IP. The packeting operation is executed under the control of the CPU 10, in synchronization with the sampling clock included in the clock signal Ssc outputted by the audio decoder 87.

That is, when detecting a rise of the sampling signal in the clock signal Ssc, the CPU 10 firstly writes an IC header IPH (refer to FIG. 4) of 32 bits as the addition data Sap into the RAM 21, and further writes an error correction code of 32 bits to correct an error of the content of the IC header IPH. In FIG. 7 as shown later, the IC header IPH itself and the error correction code are collectively used as the IC header IPH.

Next, the CPU 10 writes an CIP header CIPH (refer to FIG. 4) of 64 bits as the addition data Sap into the RAM 21.

At this time, the operation for writing into the RAM 21 is executed by outputting the addition data Sap to a data bus (not shown) connected between the RAM 21 and the CPU 10, and meanwhile incrementing an address bus (not shown) similarly connected between the RAM 21 and the CPU 10, one byte by one byte.

In parallel with this operation, the label appending unit 20 generates a later-described label of 8 bits for each channel, in response to the inputted audio data Sad, so that the audio data Sad and the label are written into the RAM 21 as the label appendix data Sbl. At this time, a data length per channel is 32 bits. Among them, the label occupies an amount corresponding to 8 bits, and the audio data Sad occupies an amount corresponding to 24 bits.

Next, the CPU 10 writes the output control data, which is included in the output control signal Sfk outputted by the audio decoder 7, as the addition data Sap into the RAM 21.

Then, the operation for the label appending unit 20 to write the label appendix data Sbl into the RAM 21 and the operation for the CPU 10 to write the addition data Sap into the RAM 21 are repeated by the number of times (hereafter, this number of times is assumed to be "n") set in advance for different audio data Sad.

Here, the repetition number n is set in advance in accordance with the sampling frequency and the number of quantization bits of the audio data 243 to be packeted, and the transmission bit rate of the interface based on the serial bus standard and the like. Actually, for example, the value of n is set to 16.

Next, when the operation for writing the label appendix data Sbl and the addition data Sap into the RAM 21 are perfectly completed, the error correction code data CRC of 32 bits to perform an error correction on all the data within the isochronous packet IP is finally written into the RAM 21.

Due to the above-mentioned operations, all the data to constitute one isochronous packet IP are written into the RAM 21.

Then, after the completion of the operation for writing the respective data, the RAM 21 outputs the respective data to the parallel/serial converting unit 22 as a memory signal Smr that is parameter data.

Accordingly, the parallel/serial converting unit 22 converts the content of the memory signal Smr into the serial data, and outputs it as serial memory data Ssr to the link layer forming unit 23.

Then, the link layer forming unit 23 generates a link layer as the isochronous packet IP by using the data included in the serial memory signal Ssr in accordance with the serial bus standard, and also generates a link signal Slk to thereby output it to the physical layer forming unit 24.

Finally, the physical layer forming unit 24 generates a physical layer as the isochronous packet IP by using the data included in the link signal Slk in accordance with the serial bus standard, and finally generates the isochronous packet IP to form and output a transmission signal Sie to the IEEE 1394 interface (not shown).

Next, the actual configuration of the isochronous packet IP outputted by the packeting unit 13 as the transmission signal Sie will be described below with reference to FIGS. 7 and 8. In FIGS. 7 to 9, four bytes (23 bits) in the isochronous packet IP is shown as one row, for the purpose of easy explanation.

As shown in FIG. 7, one isochronous packet IP has a configuration of 32 bits×(4+n×8+1) rows as a whole.

Among them, the first four rows are occupied by the IC header ICH and the CIP header CIPH.

The fifth to tenth rows are occupied by audio data AD1 to AD6 (respectively 24 bits) which are the actual audio sampling information, with labels LB1 to LB6 (respectively 8 bits) as respective leads. Here, the respective audio data AD1 to AD6 correspond to the audio data Sad of the first to sixth channels, respectively. Also, the respective labels LB1 to LB6 include information indicative of attributes (e.g., the channel numbers) of the respective subsequent audio data AD1 to AD6.

Moreover, the eleventh row includes a first output control data (24 bits) which is the output control data to be included in all the isochronous packets IP of the above-mentioned output control data and transmitted by using a label LB7 (8 bits) indicative of attributes of the subsequent respective data in the eleventh row as a lead.

Here, the label LB7 has a value of 8 bits different from those of the labels LB1 to LB6, and indicates that data of subsequent 24 bits is the first output control data.

Moreover, the first output control data actually includes: dynamic range control data DRC (8 bits) to control a dynamic range when the audio information is reproduced after a transmission; an emphasis flag EF (1 bit) indicating whether or not an emphasis process is performed on the audio information; reserved data RD (1 bit); down mix mode data DMM (1 bit) indicating whether or not a down mix is allowed for the audio information at the time of the reproduction; down mix code identification data DMCV (1 bit) indicating whether or not the subsequent down mix code data DMC actually has a value; down mix code data DMC (4 bits) indicating a table number necessary for the control of the down mix; copy control (for example, a copy control as to whether a copy is allowed only one time after the transmission or a copy is inhibited after the transmission) data CCI (2 bits) to the audio data included in the isochronous packet IP; and reserved data RD (6 bits).

Here, the down mix at the time of the reproduction implies the following operation. That is, the audio data Sad to be packeted in this embodiment, which includes the audio information corresponding to 6 channels so as to be used for the surround reproduction, is re-synthesized to the number of channels equal to or less than 6 (for example, two channels for a right reproduction and a left reproduction and the like) and is then reproduced to be outputted at the time of the reproduction.

Next, the twelfth row includes second output control data (24 bits), which is the output control data to be included in the isochronous packet IP and outputted only if it is necessary to change the sampling frequency at the time of the reproduction after the transmission among the above-mentioned output control data, by using a label LB8 (8 bits) indicative of attributes of the subsequent respective data in the twelfth row as a lead.

Here, the label LB8 has a value of 8 bits different from those of the labels LB1 to LB7, and indicates that the data of subsequent 24 bits is not the first output control data and is not the audio data AD1 to AD6.

Moreover, the second output control data actually includes: address data AR (for example, this has "00000000" at a value of 8 bits) indicating that the subsequent data is the second output control data; sampling frequency data FS2 (4 bits) to specify a sampling frequency at the time of the reproduction after the transmission of a preset channel group (for example, a channel group used for a backward reproduction) in the surround reproduction; channel type data MCT (4 bits) indicative of a channel type in the audio data Sad; channel assignment data CA (5 bits) indicative of a channel assignment (i.e., a channel assignment in each audio data Sad) at the time of the reproduction after the transmission; table parity data TP (1 bit) indicative of a timing when the table used at the time of the down mix is changed; and reserved data RD (2 bits).

As shown in FIG. 8, the CIP header CIPH at least includes: a node identifier (Source ID) SID for identifying a node sending out the isochronous packet IP including the CIP header CIPH; a data block number DBS indicative of the number of data blocks included in the data area DF; order information (Data Block Counter) DBC which is successively given in the transmission order to data within a plurality of data areas DF sent out from one node; a data identifier (which is a format ID and has a content indicating that it is the audio data Sad, in this embodiment) FMT indicative of a kind of data included in the data area DF; relation information (Format Dependent Field) FDF related to the type of the data indicated by the data identifier FMT (which is a type (i.e., a data type having an actual data of 24 bits and a label of 8 bits and the like) of the subsequent respective data and the sampling frequency of the audio data Sad included in the isochronous packet IP); and process time information SYT implying a time when a corresponding process is started after the data included in the data area DF is received by a node receiving the data.

In addition, the twelfth row in the isochronous packet IP shown in FIG. 7 may be designed such that, if the second output control data is not transmitted, the value of the address data AR is set at a different value (for example, "00000001") from the case of the transmission of the second output control data, as shown in FIG. 9, and for example, arbitrary data OD such as character data and the like is transmitted.

As described above, the data in the fifth to twelfth rows shown in FIG. 7 constitute the data of one information unit corresponding to one sampling timing in the audio data Sad to be transmitted. The data of the one information unit corresponding to the n sampling timings is assembled in one isochronous packet IP, as mentioned above. As a result, the data of the one information unit in the fifth to twelfth rows is arrayed in the one isochronous packet IP by only n sets in total.

Then, the error correction data CRC of 32 bits to perform the error correction on all the data within the isochronous packet IP is appended to a final tail of one isochronous packet IP. Finally, the one isochronous packet IP is composed of the respective data as mentioned above.

In the configuration of the isochronous packet IP shown in FIG. 7 or 9, the fifth to $(4+n\times8+1)^{th}$ rows correspond to the data area DF shown in FIG. 4.

Next, the processes of the CPU 10 and the packeting unit 13 at the time of generating the isochronous packet IP having the above-mentioned configuration will be collectively described below with reference to a flowchart shown in FIG. 10.

When one isochronous packet IP is formed, as shown in FIG. 10, at first, the respective headers (i.e., the IC header ICH (including the data to correct the error in the IC header ICH) and the CIP header CIPH) are generated, and are written to the first to fourth rows in the RAM 21 (Step S1). Next, the audio data Sad is divided for each 24 bits, and the labels LB1 to LB2 are added. Then, they are written to the fifth to tenth rows in the RAM 21 (Step S2).

Then, the RF decoder 7 extracts the first output control data from the private header 242 (Step S3), and writes this to the eleventh row in the RAM 21 (Step S4).

Next, the RF decoder 7 extracts the second output control data at its timing from the private header 242 (Step S5), and then compares the extracted second output control data with a second output control data in an extraction timing at a previous time (stored in the CPU 10, as described later) (Step S6). If they are equal to each other (Step S6; YES), it is determined that the new second output control data is not required to be packeted and outputted. Then, the above-mentioned arbitrary data OD is written to the eighth row in the RAM 21 (Step S7), and the operational flow proceeds to a step S10.

On the other hand, if it is judged at the step S6 that the extracted second output control data is not equal to the second output control data in the extraction timing at the previous time (Step S6; NO), it is determined that the new second output control data is required to be packeted and outputted. Then, the second output control data is written to the eighth row in the RAM 21 (Step S8), and the second output control data is stored into a memory (not shown) in the CPU 10 (Step S9).

Then, it is judged whether or not the processes at the steps S2 to S9 are performed on the audio data Sad (namely, the audio data Sad corresponding to the n sample timings) to be arrayed within one isochronous packet IP (Step S10). If the processes have already been performed (Step S10; YES), the error correction data CRC is written to the $(4+n\times8+1)^{th}$ row on the RAM 21 (Step S11). Then, the processes are ended. If the processes are not completed (Step S10; NO), the operational flow returns back to the step S2 so as to perform the processes at the steps S2 to S10 on the residual audio data Sad.

As mentioned above, according to the operations of the information reproducing apparatus 100 in the embodiment, the output control data included in the private header 242 is added to the audio data AD1 to AD6 to then generate the respective isochronous packets IP based on the serial bus standard. Thus, the audio data Sad in which the output control data is included can be effectively converted into the transmission signal Sie and transmitted, and the reproduction of the audio data Sad after the transmission can be controlled by the output control data.

Also, if the transmission of the second output control data is not required, the isochronous packet IP is constituted after another arbitrary data OD is included therein. Thus, the arbitrary data OD can be also effectively transmitted together with the second output control data.

Moreover, the first output control data at least includes the emphasis flag EF, the dynamic range control data DRC, the down mix code data DMC and the like, and the second output control data includes at least the sampling frequency data FS. Thus, when the audio data Sad is reproduced after the transmission, it is possible to surely carry out the emphasis process, the process for controlling the reproduction band width of the audio data Sad, the down mix process, the process for recognizing the sampling frequency and the like.

Furthermore, the labels LB7 and LB8 are respectively transmitted prior to the respective transmissions of the first output control data and the second output control data. Thus, the transmission destination can surely recognize the contents of the first output control data and the second output control data, respectively.

Also, it is possible to output the transmission signal Sie in accordance with the serial bus standard, and further possible to reproduce the audio data Sad recorded on the DVD audio disc 200 and the like.

In the above-mentioned embodiments, the case is described in which the audio information is reproduced or transmitted from the DVD audio disc 200 where the non-compressed information is recorded. However, other than this case, the present invention can be applied to a case of reproducing or transmitting compressed audio information from a DVD audio where the compressed audio information is recorded.

Also, in the above-mentioned embodiments, the case is described in which the audio information recorded in advance on the DVD audio disc 200 is reproduced or transmitted. However, other than this case, the present invention can be applied to a case of transmitting the audio information reproduced from an optical disc on which dynamic picture information and the like are recorded in accordance with the DVD video standard or a case of reproducing or transmitting the audio information which is obtained by a reception of a broadcast wave and is based on the DVD audio standard.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-110132 filed on Apr. 16, 1999 including the specification, claims, drawings and summary is incorporated herein by reference in its entirety.

What is claimed is:

1. An information converting method of converting audio information, which comprises a plurality of partial-audio information based on a predetermined record standard in each of which output control information to control a state of the audio information at a time of outputting the audio information to an external portion is included, into transmission information to be transmitted through a data bus based on a predetermined transmission standard, said method comprising:

an extracting process of extracting the output control information from each of the partial-audio information;

a dividing process of dividing the audio information for a predetermined amount, which is set in advance so as to transmit the transmission information through the data bus, to thereby generate divided-audio information;

a generating process of adding the extracted output control information onto the generated divided-audio information to thereby generate an information unit for transmitting the audio information through said data bus; and an outputting process of generating the transmission information by using a plurality of the generated information units and outputting the generated transmission information onto said data bus, wherein the output control information comprises:

first output control information to be transmitted through said data bus; and second output control information to be transmitted through said data bus, and wherein said generating process generates the information unit comprising the divided-audio information, the first output control information and either the second output control information or predetermined other information, the first output control information comprises mix control information to perform a channel mix process of the audio information at the time of outputting, and the second output control information comprises frequency identification information indicative of a sampling frequency of the audio information.

2. An information converting method according to claim 1, wherein said generating process adds first identification information indicative of a content of the first output control information at a position to be transmitted prior to the first output control information within each of the information unit, and said generating process adds second identification information indicative of a content of the second output control information at a position to be transmitted prior to the second output control information within each of the information unit.

3. An information converting method according to claim 1, wherein the predetermined transmission standard is an IEEE (Institute of Electrical and Electronic Engineers) 1394 standard, said data bus comprises a serial data bus through which the transmission information is transmitted in accordance with the IEEE 1394 standard, and said information unit comprises one portion of an isochronous packet based on the IEEE 1394 standard.

4. An information converting method according to claim 1, wherein the predetermined record standard is a DVD audio standard, the partial-audio information comprises an audio pack based on the DVD audio standard, and the output control information comprises information in a private header based on the DVD audio standard.

5. An information converting apparatus for converting audio information, which comprises a plurality of partial-audio information based on a predetermined record standard in each of which output control information to control a state of the audio information at a time of outputting the audio information to an external portion is included, into transmission information to be transmitted through a data bus based on a predetermined transmission standard, said apparatus comprising:

an extracting device for extracting the output control information from each of the partial-audio information;

a dividing device for dividing the audio information for a predetermined amount, which is set in advance so as to transmit the transmission information through the data bus, to thereby generate divided-audio information;

a generating device for adding the extracted output control information onto the generated divided-audio information to thereby generate an information unit for transmitting the audio information through said data bus; and an outputting device for generating the transmission information by using a plurality of the generated information units and outputting the generated transmission information onto said data bus, wherein the output control information comprises:

first output control information to be transmitted through said data bus; and second output control information to be transmitted through said data bus, and wherein said generating device generates the information unit comprising the divided-audio information, the first output control information and either the second output control information or predetermined other information, the first output control information comprises mix control information to perform a channel mix process of the audio information at the time of outputting, and the second output control information comprises frequency identification information indicative of a sampling frequency of the audio information.

6. An information converting apparatus according to claim 5, wherein said generating device adds first identification information indicative of a content of the first output control information at a position to be transmitted prior to the first output control information within each of the information unit, and said generating device adds second identification information indicative of a content of the second output control information at a position to be transmitted prior to the second output control information within each of the information unit.

7. An information converting apparatus according to claim 5, wherein the predetermined transmission standard is an IEEE (Institute of Electrical and Electronic Engineers) 1394 standard, said data bus comprises a serial data bus through which the transmission information is transmitted in accordance with the IEEE 1394 standard, and said information unit comprises one portion of an isochronous packet based on the IEEE 1394 standard.

8. An information converting apparatus according to claim 5, wherein the predetermined record standard is a DVD audio standard, the partial-audio information comprises an audio pack based on the DVD audio standard, and the output control information comprises information in a private header based on the DVD audio standard.

9. An information reproducing apparatus comprising:
(i) an information converting apparatus for converting audio information, which comprises a plurality of partial-audio information based on a predetermined record standard in each of which output control information to control a state of the audio information at a time of outputting the audio information to an external portion is included, into transmission information to be transmitted through a data bus based on a predetermined transmission standard, said information converting apparatus comprising:
an extracting device for extracting the output control information from each of the partial-audio information;
a dividing device for dividing the audio information for a predetermined amount, which is set in advance so as to transmit the transmission information through the data bus, to thereby generate divided-audio information;
a generating device for adding the extracted output control information onto the generated divided-audio information to thereby generate an information unit for transmitting the audio information through said data bus; and
an outputting device for generating the transmission information by using a plurality of the generated information units and outputting the generated transmission information onto said data bus,
wherein the output control information comprises:
first output control information to be transmitted through said data bus; and
second output control information to be transmitted through said data bus, and
wherein said generating device generates the information unit comprising the divided-audio information, the first output control information and either the second output control information or predetermined other information,
the first output control information comprises mix control information to perform a channel mix process of the audio information at the time of outputting, and
the second output control information comprises frequency identification information indicative of a sampling frequency of the audio information,
(ii) a reproducing apparatus for reproducing the audio information.

10. An information reproducing apparatus according to claim 9, wherein
said generating device adds first identification information indicative of a content of the first output control information at a position to be transmitted prior to the first output control information within each of the information unit, and
said generating device adds second identification information indicative of a content of the second output control information at a position to be transmitted prior to the second output control information within each of the information unit.

11. An information reproducing apparatus according to claim 9, wherein
the predetermined transmission standard is an IEEE (Institute of Electrical and Electronic Engineers) 1394 standard,
said data bus comprises a serial data bus through which the transmission information is transmitted in accordance with the IEEE 1394 standard, and
said information unit comprises one portion of an isochronous packet based on the IEEE 1394 standard.

12. An information reproducing apparatus according to claim 9, wherein
the predetermined record standard is a DVD audio standard,
the partial-audio information comprises an audio pack based on the DVD audio standard, and
the output control information comprises information in a private header based on the DVD audio standard.

13. An information converting method according to claim 1, wherein the second output control information and the predetermined other information have address information indicating that succeeding information is the second output control information or the predetermined other information.

14. An information converting method according to claim 1, wherein the information unit is one sampling unit and comprises the divided-audio information, the first output control information and the second output control information,
wherein the divided-audio information comprising audio information divided by each channel.

15. An information converting apparatus according to claim 5, wherein the second output control information and the predetermined other information have address information indicating that succeeding information is the second output control information or the predetermined other information.

16. An information converting apparatus according to claim 5, wherein the information is one sampling unit and comprises the divided-audio information, the first output control information and the second output control information,
wherein the divided-audio information comprising audio information divided by each channel.

17. An information reproducing apparatus comprising
an inputting device for inputting transmission information comprising a plurality of information units through a data bus based on a predetermined transmission standard, each of the information units comprising an audio information and output control information to control a state of the audio information at a time of outputting the audio information, the output control information comprising first output control information, wherein each of the information units further comprises either one of second output control information and predetermined other information, the first output control information comprises mix control information to perform a channel mix process of the audio information at the time of outputting, and the second output control information comprises frequency identification information indicative of a sampling frequency of the audio information,
a reproducing device for reproducing the audio information based on the output control information.

18. An information reproducing apparatus according to claim 17, wherein the second output control information and the predetermined other information have address information indicating that succeeding information is the second output control information or the predetermined other information.

19. An information reproducing apparatus according to claim 17, wherein the information unit is one sampling unit and comprises the audio information, the first output control information and the second output control information,
wherein the audio information is divided by each channel.

20. An information reproducing apparatus according to claim 19, wherein the reproducing device reproduces the audio information based on the first output control information and the second output control information.

21. An information reproducing apparatus according to claim 18, wherein the reproducing device determines whether the succeeding information is the second output control information or the predetermined other information based on the address information, and reproduces the audio information based on the first output control information and the second output control information if the succeeding information is the second output control information.

* * * * *